(12) United States Patent
Braje

(10) Patent No.: US 11,596,262 B2
(45) Date of Patent: Mar. 7, 2023

(54) METHOD AND SYSTEM FOR PREPARING A BEVERAGE

(71) Applicant: Jan Lukas Braje, Dresden (DE)

(72) Inventor: Jan Lukas Braje, Dresden (DE)

( * ) Notice: Subject to any disclaimer, the term of this patent is extended or adjusted under 35 U.S.C. 154(b) by 444 days.

(21) Appl. No.: 16/649,003

(22) PCT Filed: Sep. 24, 2018

(86) PCT No.: PCT/EP2018/075833
§ 371 (c)(1),
(2) Date: Mar. 19, 2020

(87) PCT Pub. No.: WO2019/057979
PCT Pub. Date: Mar. 28, 2019

(65) Prior Publication Data
US 2020/0288907 A1    Sep. 17, 2020

(30) Foreign Application Priority Data
Sep. 22, 2017   (DE) .......................... 102017216857.9

(51) Int. Cl.
*A47J 31/52*     (2006.01)
*B67D 1/00*      (2006.01)
(Continued)

(52) U.S. Cl.
CPC .......... *A47J 31/521* (2018.08); *B67D 1/0041* (2013.01); *B67D 1/0888* (2013.01);
(Continued)

(58) Field of Classification Search
CPC ... A47J 31/521; B67D 1/0041; B67D 1/0888; G06K 7/1413; G06K 7/1417;
(Continued)

(56) References Cited

U.S. PATENT DOCUMENTS 7,439,859 B2 * 10/2008 Humphrey ........... G06Q 20/204
235/383
2005/0087255 A1 * 4/2005 Humphrey .............. G07F 7/025
141/94
(Continued)

FOREIGN PATENT DOCUMENTS

AU        2016208413 A1 *  8/2016 ........... B67D 1/0041
EP        2759991 A1       7/2014
(Continued)

OTHER PUBLICATIONS

International Search Report, dated Nov. 15, 2018, for PCT/EP2018/075833, pp. 5.

*Primary Examiner* — Bob Zadeh
(74) *Attorney, Agent, or Firm* — International IP Law Group, PLLC

(57) ABSTRACT

The invention relates to a method and a system for beverage preparation according to a person-specific, individual recipe. The method for preparing a beverage according to an individual recipe takes place by using a preparation device comprising a positioning device for a drinking vessel and a receiving device for an identification feature. The method includes creating an individual recipe, storing the individual recipe in a recipe pool of a data storage unit, whereby the data storage unit can be reached via an EDP network, linking the identification feature to the recipe pool, positioning the drinking vessel into the preparation device, receiving the identification feature, retrieving the recipe pool that is linked to the identification feature, preparing the beverage according to a recipe from the recipe pool, and filling the beverage into the drinking vessel by the preparation device.

8 Claims, 3 Drawing Sheets

(51) Int. Cl.
  *B67D 1/08* (2006.01)
  *G06K 7/14* (2006.01)
  *G07F 13/06* (2006.01)
(52) U.S. Cl.
  CPC ......... *G06K 7/1413* (2013.01); *G06K 7/1417* (2013.01); *G07F 13/065* (2013.01)
(58) Field of Classification Search
  CPC .... G07F 13/065; G07F 7/0609; G07F 7/0893; G06Q 20/327; G06Q 20/352
  See application file for complete search history.

(56) References Cited

U.S. PATENT DOCUMENTS

| | | |
|---|---|---|
| 2006/0188620 A1 | 8/2006 | Gutwein et al. |
| 2008/0257948 A1* | 10/2008 | Jochim ................. G07F 13/025 235/375 |
| 2009/0070234 A1* | 3/2009 | Peters .................. B67D 1/0041 705/26.1 |
| 2010/0125362 A1* | 5/2010 | Canora ................ G06Q 20/327 235/487 |
| 2012/0245732 A1* | 9/2012 | Yoakim ................... G07F 9/026 709/224 |
| 2015/0046877 A1 | 2/2015 | Cuppari et al. |
| 2015/0082243 A1* | 3/2015 | Taylor ................... G06F 3/0482 715/814 |
| 2015/0305551 A1 | 10/2015 | Rosati et al. |
| 2017/0186110 A1* | 6/2017 | Carpenter ............. G06Q 50/12 |
| 2020/0288907 A1* | 9/2020 | Braje .................... G07F 13/065 |

FOREIGN PATENT DOCUMENTS

| | | | |
|---|---|---|---|
| JP | 2014502751 A | * | 3/2014 |
| WO | WO-2015153565 A1 | * | 10/2015 ........... G06K 7/1413 |

* cited by examiner

METHOD AND SYSTEM FOR PREPARING A BEVERAGE

CROSS REFERENCE TO RELATED APPLICATIONS

Pursuant to 35 U.S.C. § 371, this application is the United States National Stage Application of International Patent Application No. PCT/EP2018/075833, filed Sep. 24, 2018, the contents of which are incorporated by reference as if set forth in their entirety herein, which claims priority to German (DE) Patent Application No. 102017216857.9, filed Sep. 22, 2017, the contents of which are incorporated by reference as if set forth in their entirety herein.

BACKGROUND

A product dispenser comprising a user interface is known from the international patent application WO 2009/032946 A1. Inputs by a consumer can be transmitted to the product dispenser via the user interface, whereby the inputs can also relate to the selection of a product from a predetermined product selection list. The product dispenser can also comprise a reader, by means of which identification information associated with a consumer can be obtained. A beverage preparation according to individual recipe is not possible.

A beverage dispenser is known from the international patent application WO 2014/188389 A1, which fills beverages, which are available in a keg, into a drinking vessel, whereby the beverage dispenser has a reader for a data carrier, on which identification data of a user is stored. When a user identifies himself with a data carrier of this type, the beverage dispenser fills a corresponding amount of a beverage from a keg into a drinking vessel and posts the costs for the beverage on a user account, which is likewise identified via the identification data on the data carrier. A beverage preparation according to individual recipe is not possible.

Coffee machines, which have a storage means, in which a limited number of recipes for coffee creations can be stored, are also known in the prior art. In the case of a fully automatic coffee machine from a known manufacturer, for example personalized, individual presets for four users can be stored. These presets can relate, for example, to the used amount of coffee, the grinding degree, the percentage of milk and milk froth and/or the brewing temperature. A user can retrieve one of the maximally four stored coffee recipes directly at the coffee machine, and can have a corresponding coffee preparation made individually for him. It is thus possible with this machine to store four different, individual recipes for coffee preparations, and to produce a coffee preparation by means of an interaction of the user with the machine, i.e. a selection of a concept. The user thus has to actively make a selection. The user can furthermore retrieve a coffee creation according to his individual recipe only at this machine. When travelling, for example, he can make a coffee creation according to his individual recipe only by manually setting a correspondingly settable device. He has to carry the respective individual recipe with him for this purpose.

SUMMARY

The invention relates to a method and a system for beverage preparation. The invention relates in particular to a method and a system for preparing beverages according to a person-specific, individual recipe.

It is the object of the invention to provide a method for preparing a beverage according to an individual recipe, in the case of which the user can prepare a beverage according to an individual recipe in a simple way, whereby it is to be possible to be able to prepare the beverage according to the same individual recipe at different locations. It is also an object of the invention to specify a corresponding system for the individual preparation of beverages.

An inventive method for preparing a beverage according to an individual recipe uses a preparation device, for example a coffee machine comprising a positioning device for a drinking vessel, for example for a cup, as well as comprising a receiving device for an identification feature. The inventive method also uses a drinking vessel and is characterized by the steps of creating an individual recipe, storing the individual recipe in a recipe pool of a data storage unit, whereby the data storage unit can be reached via an Electronic Data Processing (EDP) network, linking the identification feature to the recipe pool, positioning the drinking vessel into the preparation device, receiving the identification feature, retrieving the recipe pool, which is linked to the identification feature, preparing the beverage according to a recipe from the recipe pool. The beverage can subsequently be filled into the drinking vessel by the preparation device.

In an advantageous embodiment, the identification feature is an individual feature, which is associated with the drinking vessel. The identification feature can thereby be received by the preparation device. For this purpose, the preparation device can have a reader. The individual feature associated with the drinking vessel can be, for example, a geometric feature, such as, for example, the shape of the drinking vessel, or the weight of the drinking vessel or the color or a color combination, respectively, of the drinking vessel. The individual feature can furthermore also be a code, such as a barcode or a QR code. The individual feature can furthermore also be an electronic feature, which is stored on a data carrier, which is associated with the drinking vessel, whereby the data carrier can be read by the reader. The reader can be, for example, an image recognition system comprising a camera, a computing means, and a database comprising previously stored images of drinking vessels, or a scale.

In the case of another advantageous embodiment, the identification feature is stored on a mobile communication device, whereby the mobile communication device is suitable for the wireless communication in the near field. Suitable mobile communication devices are, for example, NFC-enabled devices, i.e. devices comprising near-field communication functionality. In addition, communication devices, which can communicate, for example, via RFID (radio frequency identification) or other radio standards, such as, for example, Bluetooth, in the near field, are also suitable. The communication technology can thereby be installed on different devices, such as, for example, mobile telephones, credit or identification cards, for example on passports.

In another advantageous embodiment, a biometric feature of the user is used as identification feature, as known from authentication methods via biometric features. For example facial, iris or fingerprint recognition are used thereby. It is also possible to deduce an identification feature from a biometric feature of the user.

The recipe pool may contain only a single recipe. In this case, the beverage is prepared directly after the retrieval of the recipe pool, which is linked to the identification feature.

In an alternative embodiment, the recipe pool contains a plurality of recipes. A selection of the concrete recipe takes place in this case between the retrieval of the recipe pool, which is linked to the identification feature, and the preparation of the beverage. This can take place by the user directly at the preparation device. In the alternative, however, this can also take place at the mobile communication device.

The user sets an individual recipe once or selects a ready-made recipe. This can take place at the preparation device or also at an input device, such as, for example, a computer or the mobile communication device. This recipe is stored in a recipe pool of a data storage unit. In an advantageous embodiment, the data storage unit is stored on a central data processing means, which can be reached by different preparation devices, for example a database in a cloud. In the alternative or in addition, the data storage unit, however, can also be installed regionally, for example in a building or in a preparation device. The data storage unit can be reached in a wired or also wireless manner via an EDP network, for example the Internet or a local network (LAN). The identification feature is linked to the recipe pool. This can take place, for example, in the data storage unit, which is operatively connected to a corresponding data processing unit for this purpose.

After performing these steps, the user can position the drinking vessel into the preparation device. The preparation device now receives the identification feature. The preparation device subsequently gets in touch with the data storage unit in order to retrieve retrieving the recipe pool, which is linked to the identification feature. If the recipe pool contains only one recipe, beverage is prepared according to this individual recipe by the preparation device and is filled into the drinking vessel. If the recipe pool contains a plurality of recipes, the user can select the desired recipe from the recipe pool. This can take place either directly at the preparation device or at an input device, for example the mobile communication device.

If only one recipe is stored in the recipe pool, the only necessary interaction of the user with the preparation device thus lies in positioning the drinking vessel into the placing device of the preparation device. The individual recipe is automatically retrieved by the preparation device and a beverage is prepared according to the individual recipe. If the recipe pool contains a plurality of recipes, the user has to additionally select one recipe from the recipe pool. The user thus does not only not need to make any additional effort in order to obtain a beverage preparation according to an individual recipe, but even saves the start-up of the beverage preparation, which is common in the prior art, by operating a switch. The recipe is stored in a central data storage unit, for example a cloud, so that the individual beverage preparation can take place at different preparation devices, in particular at preparation devices located at different locations. If the user is travelling, for example, he can obtain a beverage preparation according to his individual recipe at every location, at which a corresponding preparation device is available. In this context, a cloud is to be understood as the provision of IT infrastructure, such as, for example, memory capacity, computing capacity or application software as service via an EDP network, for example the Internet.

The user can also store several recipes in a respective separate recipe pool and can link them to different identification features. If the different identification features are each connected to a drinking vessel, the user obtains a beverage preparation according to the respective individual recipe, depending on the drinking vessel, which he positions into the positioning device of the preparation device.

In an advantageous embodiment, an ID is assigned to the respective drinking vessel for linking the identification feature to the recipe. An ID is likewise assigned to the recipe, whereby the ID of the drinking vessel is linked to the ID of the recipe in the data storage unit.

A system according to the invention for the preparation of beverages according to an individual recipe is characterized in that the system has a device having a readable identification feature and a preparation device for a beverage, whereby the preparation device has a receiving device for the identification feature, a sending device for sending data to a data storage unit, and a receiving device for receiving a recipe, which is linked to the identification feature, and also a data storage unit. The sending device and the receiving device for receiving a recipe, which is linked to the identification feature, can thereby be combined in a device. The sending and the receiving device for receiving a recipe, which is linked to the identification feature, can thereby have one or a respective antenna for wirelessly sending or receiving, respectively. The sending and the receiving device for receiving a recipe, which is linked to the identification feature, however, can furthermore also be set up for wired reception or wired sending, respectively. The device having the readable identification feature can be, for example, a corresponding drinking vessel or a mobile communication device, as described above.

In an advantageous embodiment, the data storage unit is set up on a central data processing means, which can be reached by various preparation devices. It has also turned out to be advantageous when the data storage unit can be reached via an EDP network.

In an alternative embodiment, the data storage unit is set up on a regional data processing means, for example inside the building, in which the preparation device is accommodated, or in the preparation device itself.

In a further advantageous embodiment, the drinking vessel has a data carrier, on which a date identifying the drinking vessel is stored, and the preparation device has a reader, by means of which the date identifying the drinking vessel can be read.

In a further advantageous embodiment, the identification feature is stored on a communication device, which is suitable for wireless communication in the near field, whereby the preparation device has a receiving device, by means of which the identification feature can be read. For example NFC-enabled communication devices are suitable for wireless communication in the near field. It is furthermore also conceivable that the identification feature is stored on a communication device, which can communicate by means of RFID or by means of another radio standard, such as, for example, Bluetooth.

In a further advantageous embodiment, the identification feature is a biometric feature of the user, as it is known from authentication methods via biometric features. For example facial, iris or fingerprint recognition are used thereby. The preparation device has a reader for this biometric feature in this case. It is also possible to deduce an identification feature from a biometric feature of the user.

The preparation device used in the system according to the invention is not limited to the preparation of beverages according to an individual recipe. The preparation device can generally also be set up to prepare beverages according to a standard recipe. This standard recipe can be set up in a data storage unit in the preparation device itself or on a central data processing means, which can be reached by different preparation devices.

Further features, special features, and suitable further developments of the invention follow from the subclaims and the following description of preferred exemplary embodiments by means of the illustrations.

DETAILED DESCRIPTION OF SPECIFIC EMBODIMENTS

Figure 1:
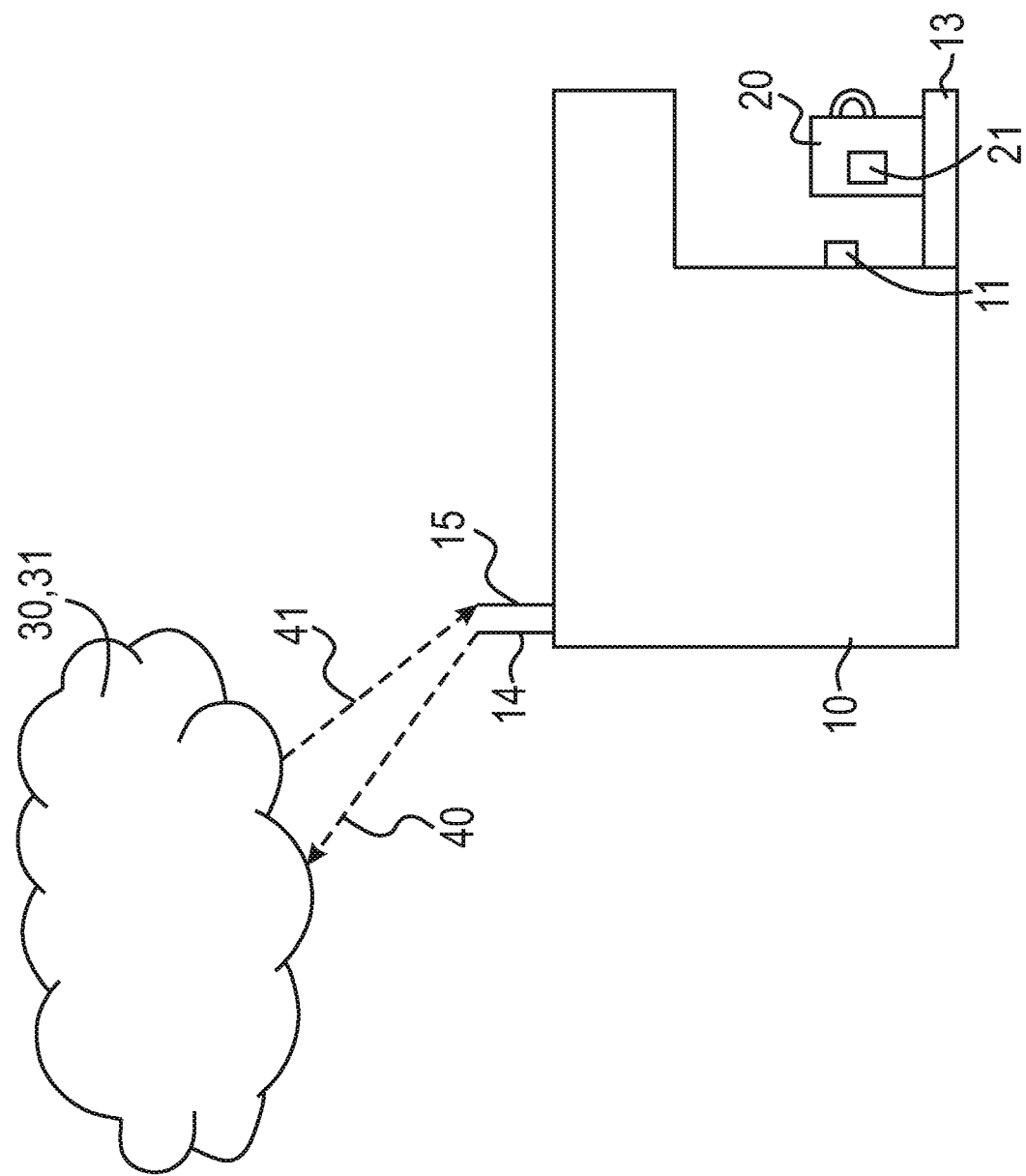
FIG. 1 shows a system according to the invention for the preparation of beverages according to an individual recipe.

FIG. 1 shows a system according to the invention for the preparation of beverages according to an individual recipe. A preparation device 10 has a positioning device 13 for positioning a drinking vessel 20. The drinking vessel 20 has an individual feature 21. This individual feature 21 can be, for example, a data carrier, on which an individual data is stored so as to be capable of being read. The preparation device 10 also has a receiving device 11, with the help of which the individual feature 21 can be received. The preparation device 10 furthermore has a sending device 14 and a receiving device 15. If a drinking vessel 20 comprising an individual feature 21 is positioned into the positioning device 13 of the preparation device 10, the receiving device 11 receives the individual feature 21 of the drinking vessel 20. The individual feature 21 is sent as send data 40 via the sending device 14 to a data processing unit 30, which has a data storage unit 31. A recipe, which was linked beforehand to the individual feature 21, is searched for in the data storage unit 31 and is sent as receive data 41 to the receiving device 15 of the preparation device 10. The preparation device 10 then prepares a beverage according to the individual recipe and fills it into the drinking vessel 20. A cloud is illustrated in the illustration as data storage unit 31. The send data 40 and receive data 41 are sent via an EDP network (not illustrated), in this case for example via the Internet, between the data storage unit 31 and the preparation device 10.

A user can create or input the individual recipe stored beforehand in the data storage unit 31, for example directly, at the preparation device 10. The creation or input of an individual recipe via a computer (not illustrated) is possible as further option, whereby the computer is likewise connected to the data storage unit 31 via an EDP network. The EDP network can also be the Internet here. However, a connection via a LAN (local area network) is likewise also possible, when the computer and the data storage unit 31 are located within this LAN. The linking of the drinking vessel 20 via the individual feature 21 thereof to the individual recipe takes place in the data storage unit 31 and can likewise be made via the preparation device 10 or another device, such as, for example, a computer connected to the data storage unit 31.

Figure 2:
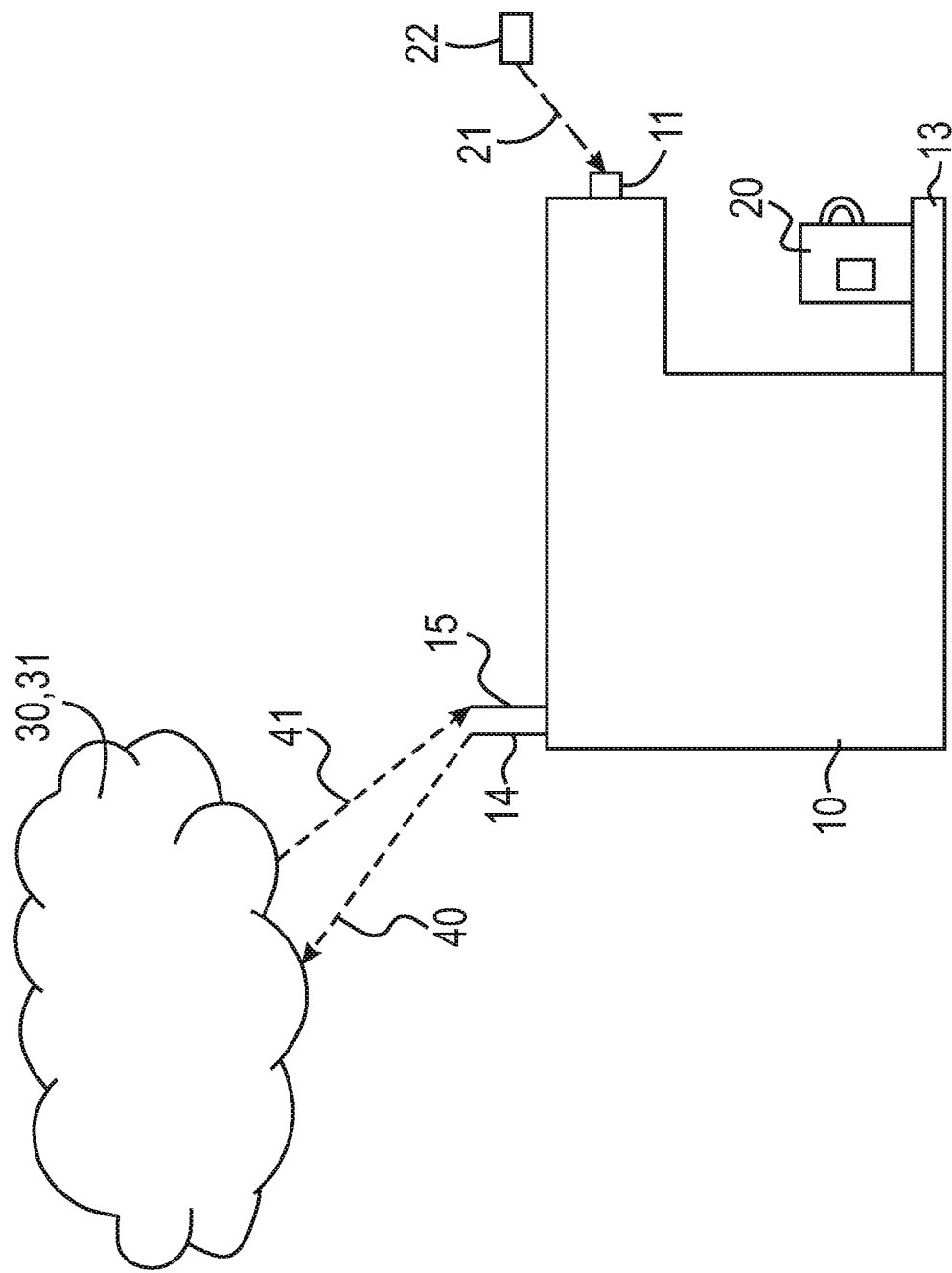
FIG. 2 shows a further embodiment of a system according to the invention for the preparation of beverages according to an individual recipe.

FIG. 2 shows a further embodiment of a system according to the invention for the preparation of beverages according to an individual recipe. In this embodiment, the device having an identification feature is a mobile telephone 22. The mobile telephone 22 sends data to the preparation device 10 via a receiving device 11, for example via NFC or Bluetooth, suggested by the dash-dotted arrow. This data represents the individual feature 21.

In this embodiment, the preparation device 10 also has a positioning device 13 for positioning a drinking vessel 20. In this embodiment, the drinking vessel 20 does not require an individual feature 21. The preparation device 10 also has a receiving device 11, with the help of which the individual feature 21 can be received. As in the embodiment described in FIG. 1, the preparation device 10 furthermore has a sending device 14 and a receiving device 15. If a drinking vessel 20 is positioned into the positioning device 13 of the preparation device 10, and if the individual feature 21 is sent to the receiving device 11 via the mobile telephone 22, the individual feature 21 is sent as send date 40 to a data processing unit 30, which has a data storage unit 31, via the sending device 14 of the preparation device 10. A recipe, which was linked beforehand to the individual feature 21, is searched for in the data storage unit 31 and is sent as receive data 41 to the receiving device 15 of the preparation device 10. The preparation device 10 then prepares a beverage according to the individual recipe and fills it into the drinking vessel 20.

The advantage of this embodiment as compared to the embodiment shown in FIG. 1 is that, if the user has stored different recipes and wants to obtain beverages according to different individual recipes, the user does not require different drinking vessels 20 comprising different individual features 21 or does not have to select a concrete recipe from his recipe pool, respectively, after he has positioned the drinking vessel 20 into the positioning device 13 of the preparation device 10. On the contrary, he makes this selection on his mobile telephone 22, before he sends the corresponding data to the preparation device 10.

Figure 3:
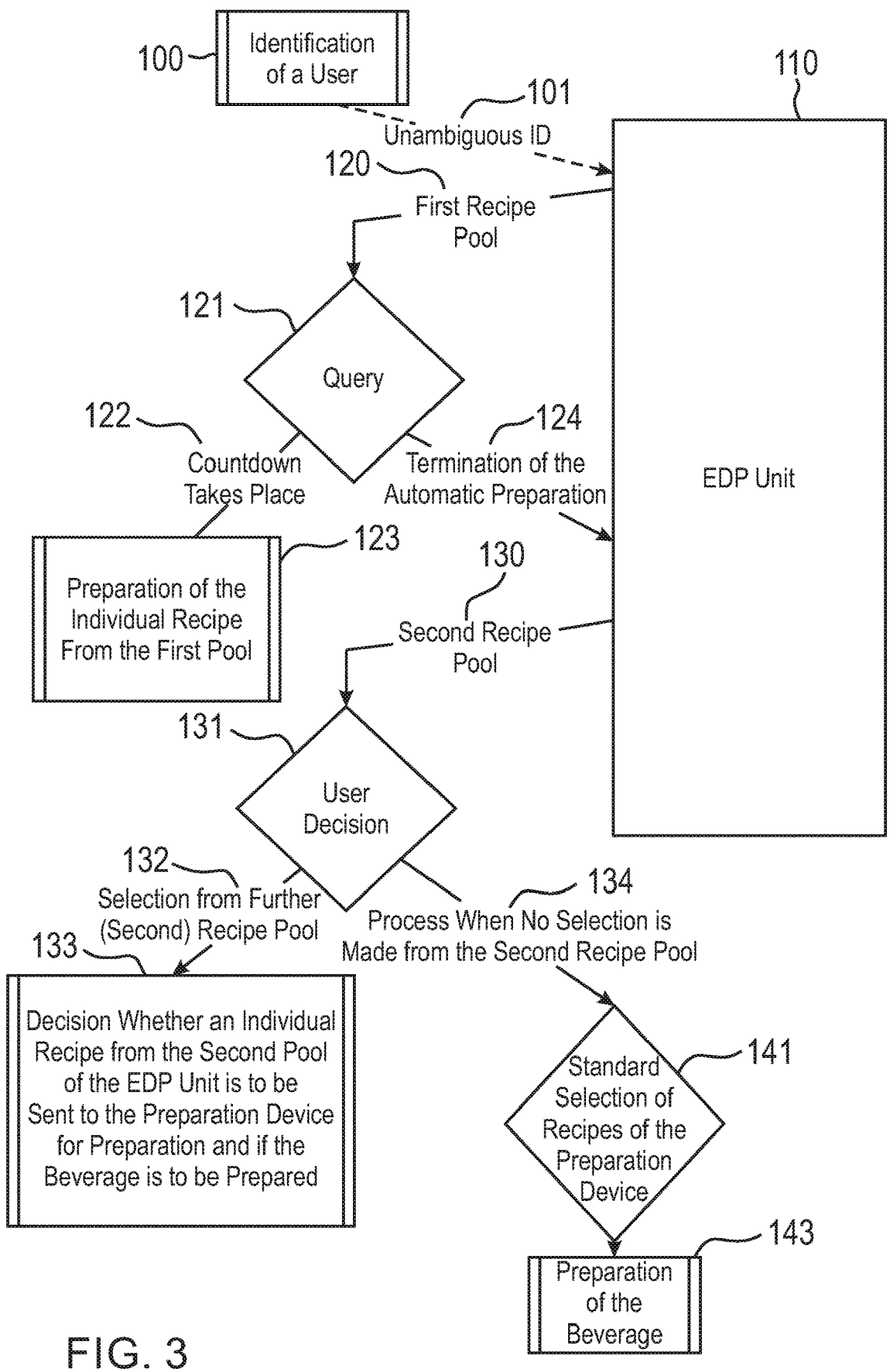
FIG. 3 shows a flowchart for the direct dispensing of a beverage by means of a recipe.

FIG. 3 shows a flowchart for a direct dispensing of a beverage by means of a recipe.

A user is first identified (100) by means of an unambiguous feature (see 11 of FIGS. 1 & 2). The unambiguous ID (101) is then sent to an EDP unit (110) (see 30, 31 of FIGS. 1 & 2).

2 types of recipe pools are stored in the EDP unit. Only one recipe, for example, can be found in the first recipe pool 120, more recipes can be present in the second recipe pool 130.

In the first step, a small number of recipes, which can be managed instantly by the user, preferably a single, individual recipe (120) (from the first recipe pool) is proposed to the user for direct preparation by the preparation device (see 10 of FIGS. 1 & 2).

A first recipe pool 120 may contain a smaller number of recipes than a second recipe pool 130.

In some embodiments, the second recipe pool 130 is displayed, if no recipe is selected from the first recipe pool (120).

In some embodiments, the second recipe pool 130 is displayed, if the first recipe pool 120 is not used.

In some embodiments, an automated selection takes place from the first recipe pool 120, when a countdown takes place.

In the first step, a single, individual recipe (120) (from the first recipe pool) is proposed to the user for direct preparation by the preparation device (see 10 of FIGS. 1 & 2). A query 121 takes place. This automatic preparation can be stopped by the user 124. This termination can be made, for example, at the preparation device itself, but is not limited thereto.

If no termination is to take place by the user—case 122, a countdown takes place, which defines the time for the termination (122) and the preparation of the individual recipe from the first pool takes place (123). If, in contrast, the automatic preparation has been terminated (124), this information is returned to the EDP unit (110).

After the termination, the EDP unit transmits the recipe/recipes from the second pool to the preparation device or to another random input field, where the user can select from the recipes (for example mobile telephone) (130). The user has to now make the decision (131) whether an individual recipe from the second pool of the EDP unit is to be sent (132) to the preparation device for preparation and is to be prepared (133).

In the alternative, a selection from the second pool (130) can also not take place (134), so that the recipes, which are available by default for the preparation device, are available for selection (134). With the selection of the default recipes (141), the user is in a selection field, which can be accessed by other users without the system described so far. A selection of the recipe (141) and then the preparation (143) takes place thereby.

Should a recipe pool be empty, the respective process 120 or 130 can be skipped. The sending of the unambiguous ID 101 via 120/121/124 without 130 directly to 141 or from 101 directly to 130 and then to 132/134 would thus be possible.

The embodiments shown here only represent examples for the present invention and must thus not be understood as a limitation. Alternative embodiments considered by the person of skill in the art are equally captured by the scope of protection of the present invention.

What is claimed is:

1. A method for preparing a beverage according to an individual recipe using a preparation device that comprises a positioning device for a drinking vessel and a receiving device for receiving an identification feature, the method comprising:
   creating individual recipes;
   storing the individual recipes to a data storage unit as a first recipe pool and a second recipe pool, wherein the first recipe pool can be managed by a user, wherein the second recipe pool is larger than the first recipe pool, and wherein the data storage unit is part of a data processing unit that can be accessed via an Electronic Data Processing (EDP) network;
   linking the identification feature to the first recipe pool;
   receiving the drinking vessel into the preparation device;
   receiving the identification feature;
   retrieving, by the preparation device, the first recipe pool that is linked to the identification feature, and proposing the individual recipes of the first recipe pool to the user for selection;
   starting a countdown, wherein an automated selection is made from the first recipe pool if the countdown has finished, and wherein the automated selection can be stopped by the user;
   if the automated selection is stopped by the user, retrieving, by the preparation device, the second recipe pool from the data storage unit, and proposing the individual recipes of the second recipe pool to the user for selection; and
   preparing the beverage according to the automated selection or the user selection from the first recipe pool or the second recipe pool.

2. The method of claim 1, comprising proposing a single, individual recipe from the first recipe pool to the user for preparation by the preparation device.

3. The method of claim 1, wherein the data processing unit is configured so that the user, after stopping the automated selection, can determine whether an individual recipe from the second recipe pool stored in the data storage unit is to be sent to the preparation device for preparation.

4. The method of claim 1, wherein the preparation device comprises a reader, and wherein the identification feature is received by the reader from a data carrier incorporated with the drinking vessel.

5. A beverage preparation device, comprising:
   a positioning device for a drinking vessel;
   a receiving device for receiving an identification feature; and
   a communication system for communicating with a data processing unit via an Electronic Data Processing (EDP) network, the data processing unit coupled to a data storage unit that stores a first recipe pool and a second recipe pool, wherein the first recipe pool is linked to an identification feature associated with a user, and wherein the second recipe pool is larger than the first recipe pool;
   wherein the beverage preparation device is configured to:
      receive the drinking vessel into the positioning device;
      receive the identification feature;
      retrieve the first recipe pool and propose recipes of the first recipe pool to the user for selection;
      start a countdown, wherein an automated selection is made from the first recipe pool if the countdown has finished, and wherein the automated selection can be stopped by the user; and
      if the automated selection is stopped by the user, retrieve the second recipe pool from the data storage unit, and propose recipes of the second recipe pool to the user for selection; and
      prepare the beverage according to the automated selection or the user selection from the first recipe pool or the second recipe pool.

6. The beverage preparation device of claim 5, wherein the beverage preparation device is configured to propose a single, individual recipe from the first recipe pool to the user for preparation by the preparation device.

7. The beverage preparation device of claim 5, wherein the data processing unit is configured so that the user, after stopping the automated selection, can determine whether an individual recipe from the second recipe pool stored in the data storage unit is to be sent to the preparation device for preparation.

8. The beverage preparation device of claim 5, wherein the preparation device comprises a reader, and wherein the identification feature is received by the reader from a data carrier incorporated with the drinking vessel.

* * * * *